G. C. MONCKMEIER.
DEVICE FOR INSERTING PISTONS IN CYLINDERS.
APPLICATION FILED JAN. 17, 1920.
1,367,622.
Patented Feb. 8, 1921.
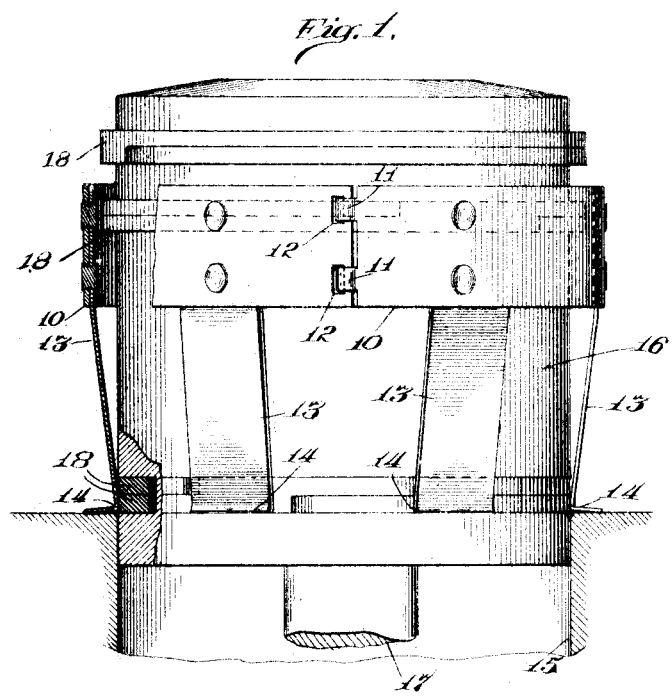
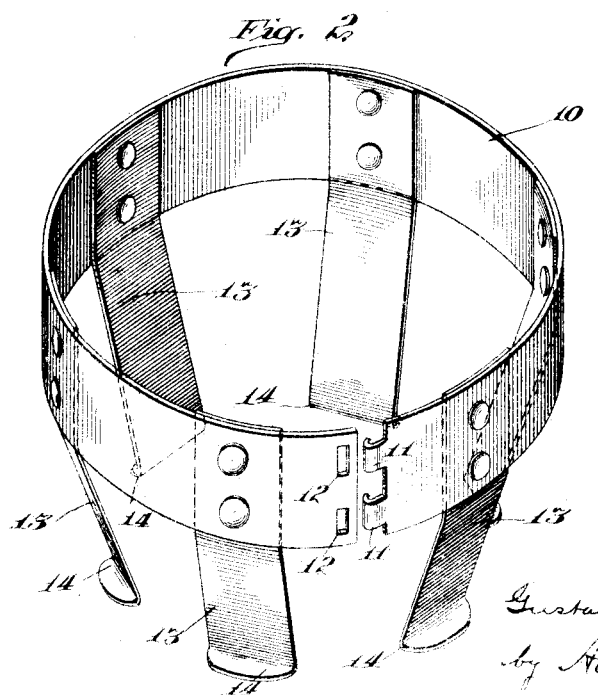

UNITED STATES PATENT OFFICE.

GUSTAV C. MONCKMEIER, OF TIPTON, IOWA.

DEVICE FOR INSERTING PISTONS IN CYLINDERS.

1,367,622.  Specification of Letters Patent.  Patented Feb. 8, 1921.

Application filed January 17, 1920. Serial No. 351,997.

*To all whom it may concern:*

Be it known that I, GUSTAV C. MONCK-MEIER, a former subject of the Emperor of Germany, now a formal declarant of intention to become a citizen of the United States, and a resident of Tipton, in the county of Cedar and State of Iowa, have invented certain new and useful Improvements in Devices for Inserting Pistons in Cylinders, of which the following is a specification, reference being had to the accompanying drawings.

My invention relates to means for pressing the piston rings of a piston into their operative position in their grooves for permitting the insertion of the piston into its cylinder. In many cases, these piston rings are quite stiff and very often the work of inserting the piston with its several piston rings in position is very difficult, particularly under conditions where access to the work is poor, as is the case in many forms of automobile engines in common use and other forms of apparatus employing pistons and cylinders reciprocating relatively to each other. It is the object of my invention to provide a device by the use of which a piston equipped with its several piston rings may be easily and quickly inserted into its cylinder, which device shall be in convenient form ready for instant use without confusion and without the necessity for adjustment, and which shall be available for convenient effective use with pistons of different sizes and for the insertion of a piston from either side of the cylinder block as may be desired without the necessity in some cases of disconnecting the piston-rod from the crank-shaft. The preferred means by which I have accomplished my objects is illustrated in the drawings and hereinafter specifically described. What I regard as new is set forth in the claims.

In the accompanying drawings—

Figure 1 is a side elevation of my improved device in position upon a piston being inserted into a cylinder, being partly broken away and partly in section.

Fig. 2 is a perspective view of my improved device.

My improved device, as illustrated in Fig. 2, comprises a band 10 formed of a strip of sheet metal bent into the form of a ring. The ends of the strip are adapted to be detachably connected together by means of hooks 11 formed integrally with the strip, said hooks being adapted to engage openings 12 in the opposite end portion. The metal of the band 10 is of such a weight and such a character as to be adapted to hold its shape normally in about the position it has when the ends are connected together as shown in Fig. 1, but the metal has sufficient resiliency to enable the ends to be spread apart to some little distance without permanently affecting the shape of the band, the grain of the strip running circumferentially of the band whereby the band has a maximum strength in proportion to its weight. The band 10 is provided with a plurality of lips or fingers 13 secured thereto by means of rivets or spot welding in spaced relation thereabout, the said lips or fingers being in the form of strips of sheet metal with the grain running longitudinally thereof. The lips or fingers 13 are bent diagonally inward in convergent position, with the extreme end portions turning outward sharply, as indicated at 14.

Referring now to Fig. 1, which illustrates the use of my improved device, 15 indicates a cylinder, only a fragmentary portion of which is shown, into which a piston 16 is being inserted from the side of the cylinder block opposite that at which the crank-shaft is located, as is shown by the position of the piston-rod 17. Piston rings 18 of any approved type are shown in appropriate grooves in the periphery of the piston in the usual manner. As is shown at the upper end of the piston, as illustrated in Fig. 1, the piston rings 18 at that point are expanded by their resiliency to a diameter greater than that of the piston. The piston ring 18 at the lower end of the piston, however, is in position between the several lips or fingers 13 of my improved device directly at the upper end of the bore of the cylinder, being compressed by such fingers to a diameter conforming to that of the piston. As will be readily understood, as the piston passes downward into the cylinder, the piston rings 18 at the upper end of the piston will be brought successively into contact with the fingers 18 by which they will be compressed so as to offer no hindrance to the continued downward movement of the piston into the cylinder.

The fingers 13 are made of such strength and resiliency as to be capable of compressing any ordinary piston ring, as is shown in Fig. 1. When the device is used with a piston of large size compared to that of the band 10, the fingers 13 are displaced outwardly to a considerable extent whereby a very considerable force is applied to the piston rings for compressing them. When, however, the device is being used upon a piston of smaller size, the pressure applied by the fingers 13 upon the piston rings is not so great, but neither is the strength of the smaller piston rings so great. I have found that a single size of device is effective upon all sizes of pistons in ordinary use in automobiles, the variation of size and strength of the piston rings being small enough to be taken care of by the variation in the pressure of the fingers 13. By the provision of the outturned ends 14 the fingers are prevented from passing downward into the cylinder, and support the tool on the cylinder.

When it is desired to insert the pistons from the side adjacent to the crank-shaft, the device will be applied to the piston in reversed position with respect to that shown in Fig. 1. After the piston has been pushed into position in such a case, the device is removed from the piston-rod 17 by disconnecting the ends of the band 10 and spreading the band apart slightly, as will be readily understood.

So far as I am aware, I am the first in the art to provide a device of this type of such construction as to be ready for instant use without being tightened or adjusted in position upon a piston and as to be effective with pistons of widely varied sizes, or to provide a device of this type comprising a band adapted to provide a firm base for a plurality of fingers which are adapted to exert a yielding pressure upon the periphery of a piston of a smaller diameter than that of the band. My claims are accordingly to be given an interpretation in keeping with the scope of my invention.

What I claim as my invention and desire to secure by Letters Patent, is—

1. A device for inserting pistons into cylinders comprising a band, and a plurality of normally converging fingers carried thereby, said fingers being arranged to be deflected by a piston introduced through the band and passed between said fingers, and to exert yielding lateral pressure on the sides of the piston.

2. A device for inserting pistons in cylinders comprising a band of firm material adapted to hold its shape, and a plurality of resilient fingers spaced about the band and extending diagonally inwardly therefrom adapted to exert a yielding pressure upon the periphery of a piston passing through the band.

3. A hollow frusto-conical device for inserting pistons into cylinders comprising a plurality of normally converging fingers adapted to exert yielding lateral pressure on the sides of a piston passed through the device, and a support on which said fingers are mounted.

4. A device for inserting pistons in cylinders comprising a split band of firm material adapted to hold its shape, and a plurality of resilient fingers spaced about the band and extending diagonally inwardly therefrom adapted to exert a yielding pressure upon the periphery of a piston passing through the band.

5. A device for inserting pistons in cylinders, comprising a split band of yielding material having means for detachably securing the ends together, and a plurality of resilient fingers spaced about the band and extending diagonally inwardly therefrom adapted to exert a yielding pressure upon the periphery of the piston passing through the band.

6. A device for inserting pistons in cylinders comprising a band of firm material adapted to hold its shape, and a plurality of resilient fingers spaced about the band and extending diagonally inwardly therefrom adapted to exert a yielding pressure upon the periphery of a piston passing through the band, the free ends of said fingers being turned outward.

7. A device for inserting pistons in cylinders, comprising a band of sheet metal strip broken at one point, hooks formed integrally therewith at one end adapted to engage openings in the opposite end portion for securing the ends together, and a plurality of resilient fingers spaced about the band and extending diagonally inwardly therefrom adapted to exert a yielding pressure upon the periphery of a piston passing through the band.

8. A device for inserting pistons is cylinders, comprising a band, and a plurality of sheet metal strips secured to said band in spaced position thereabout, said strips being in convergent position so as to exert a yielding pressure upon the periphery of a piston passing through the band.

9. A device for inserting pistons in cylinders, comprising a band of sheet metal strip broken at one point, hooks formed integrally therewith at one end adapted to engage openings in the opposite end portion for securing the ends together, and a plurality of sheet metal strips secured to said band in spaced position thereabout, said strips being in convergent position so as to exert a yielding pressure upon the periphery of a piston passing through the band.

GUSTAV C. MONCKMEIER.